(12) United States Patent
Gopalan et al.

(10) Patent No.: US 9,141,679 B2
(45) Date of Patent: Sep. 22, 2015

(54) CLOUD DATA STORAGE USING REDUNDANT ENCODING

(75) Inventors: Parikshit Gopalan, Sunnyvale, CA (US); Cheng Huang, Redmond, WA (US); Huseyin Simitci, Maple Valley, WA (US); Sergey Yekhanin, Mountain View, CA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 959 days.

(21) Appl. No.: 13/221,928

(22) Filed: Aug. 31, 2011

(65) Prior Publication Data

US 2013/0054549 A1 Feb. 28, 2013

(51) Int. Cl.
G06F 7/00 (2006.01)
G06F 17/30 (2006.01)

(52) U.S. Cl.
CPC ................................ *G06F 17/30557* (2013.01)

(58) Field of Classification Search
None
See application file for complete search history.

(56) References Cited

U.S. PATENT DOCUMENTS

| | | | |
|---|---|---|---|
| 7,823,009 B1 | 10/2010 | Tormasov et al. | |
| 7,904,782 B2 | 3/2011 | Huang et al. | |
| 7,930,611 B2 | 4/2011 | Huang et al. | |
| 2007/0208748 A1 | 9/2007 | Li | |
| 2008/0222481 A1* | 9/2008 | Huang et al. | 714/752 |
| 2010/0218037 A1 | 8/2010 | Swartz et al. | |
| 2011/0029840 A1 | 2/2011 | Ozzie et al. | |
| 2011/0055161 A1 | 3/2011 | Wolfe | |
| 2011/0119370 A1* | 5/2011 | Huang et al. | 709/224 |

OTHER PUBLICATIONS

Gopalan et. al. "On the Locality of Codeword Symbols". Jun. 20, 2011. "Electronic Colloquim on Computational Complexity". pp 1-17.*
Wang, et al., "Ensuring Data Storage Security in Cloud Computing", Retrieved at <<http://www.ece.iit.edu/~ubisec/IWQoS09.pdf>>, 17th International Workshop on Quality of Service, Jul. 13-15, 2009, p. 9.
Kamara, et al., "Cryptographic Cloud Storage", Retrieved at <<http://research.microsoft.com/pubs/112576/crypto-cloud.pdf>>, Financial Cryptography: Workshop on Real-Life Cryptographic Protocols and Standardization, Jan. 25-28, 2010, pp. 136-149.

(Continued)

*Primary Examiner* — Robert Beausoliel, Jr.
*Assistant Examiner* — Michael Pham
(74) *Attorney, Agent, or Firm* — Julie Kane Akhter; Danielle Johnston-Holmes; Micky Minhas

(57) ABSTRACT

Cloud data storage systems, methods, and techniques partition system data symbols into predefined-sized groups and then encode each group to form corresponding parity symbols, encode all data symbols into global redundant symbols, and store each symbol (data, parity, and redundant) in different failure domains in a manner that ensures independence of failures. In several implementations, the resultant cloud-encoded data features both data locality and ability to recover up to a predefined threshold tolerance of simultaneous erasures (unavailable data symbols) without any information loss. In addition, certain implementations also feature the placement of cloud-encoded data in domains (nodes or node groups) to provide similar locality and redundancy features simultaneous with the recovery of an entire domain of data that is unavailable due to software or hardware upgrades or failures.

20 Claims, 4 Drawing Sheets

(56) References Cited

OTHER PUBLICATIONS

Chen, et al., "A New Fault Tolerance System for Cloud Storage", Retrieved at <<http://www.aicit.org/jcit/ppl/05-JCIT3-810061.pdf>>, Journal of Convergence Information Technology, vol. 6, No. 4, pp. 34-41.

Bowers, et al., "HAIL: a High-Availability and Integrity Layer for Cloud Storage", Retrieved at <<http://eprint.iacr.org/2008/489.pdf>>, Proceedings of the 16th ACM conference on Computer and communications security, Nov. 9-13, 2009, pp. 1-20.

Singh, et al., "A Secured Cost-effective Multi-Cloud Storage in Cloud Computing", Retrieved at <<http://cse.unl.edu/~byrav/INFOCOM2011/workshops/papers/p625-singh.pdf>>, IEEE INFOCOM Workshop on Cloud Computing, 2011, pp. 625-630.

"High Rate Locally Decodable Codes", U.S. Appl. No. 13/052,136, Filed Date: Mar. 21, 2011, pp. 1-18.

"Erasure Coding Immutable Data", U.S. Appl. No. 12/877,175, Filed Date: Sep. 8, 2010. p. 45.

Cadambe, et al., "Distributed Data Storage with Minimum Storage Regenerating Codes—Exact and Functional Repair are Asymptotically Equally Efficient", Retrieved at <<http://arxiv.org/PS_cache/arxiv/pdf/1004/1004.4299v1.pdf>>, Electrical Engineering, 2010, pp. 11.

Dimakis, et al., "Network Coding for Distributed Storage Systems", Retrieved at <<http://ieeexplore.ieee.org/stamp/stamp.jsp?tp=&arnumber=5550492>>, IEEE Transactions on Information Theory, vol. 56, No. 9, Sep. 2010, pp. 4539-4551.

Dimakis, et al., "A Survey on Network Codes for Distributed Storage", Retrieved at <<http://www.eecs.berkeley.edu/~chsuh/ProceedingsNC.pdf>>, Proceedings of IEEE, vol. 99, No. 3, Mar. 2011, pp. 476-489.

Efremenko, Klim., "3-Query Locally Decodable Codes of Subexponential Length", Retrieved at <<http://www.cs.cmu.edu/~odonnell/hits09/efremenko-subexponential-ldcs.pdf>>, Nov. 13, 2008, pp. 1-13.

Huang, et al., "Pyramid Codes: Flexible Schemes to Trade Space for Access Efficiency in Reliable Data Storage Systems", Retrieved at <<http://home.ie.cuhk.edu.hk/~mhchen/papers/nca.07.pyramid.codes.pdf>>, Sixth IEEE International Symposium on Network Computing and Applications, Jul. 12-14, 2007, pp. 1-8.

Katz, et al., "On the Efficiency of Local Decoding Procedures for Error Correcting Codes", Retrieved at <<http://citeseerx.ist.psu.edu/viewdoc/download?doi=10.1.1.134.9822&rep=rep1&type=pdf>>, Proceedings of the thirty-second annual ACM symposium on Theory of computing, May 21-23, 2000, p. 7.

Kopparty, et al., "High-rate Codes with Sublinear-time Decoding", Retrieved at <<http://research.microsoft.com/en-us/um/people/yekhanin/papers/highratelocal.pdf>>, Proceedings of the 43rd annual ACM symposium on Theory of computing, Jun. 6-8, 2011, p. 10.

Rashmi, et al., "Optimal Exact-regenerating Codes for Distributed Storage at the MSR and MBR Points via a Product-matrix Construction", Retrieved at <<http://www.ece.iisc.ernet.in/~vijay/storage/papers/TransIT_PM.pdf>>, IEEE Transactions on Information Theory, vol. 57, No. 8, 2011, pp. 1-19.

Tsfasman, et al., "Algebraic Geometric Codes: Basic Notions", Retrieved at <<http://www.math.umass.edu/~hajir/m499c/tvn-book.pdf>>, Mathematics Subject Classification, 2000, p. 414.

Yekhanin, Sergey., "Towards 3-query Locally Decodable Codes of Subexponential Length", Retrieved at <<http://www.di.ens.fr/~vergnaud/algo0910/Locally.pdf>>, Journal of the ACM, vol. 55, No. 1, Article 1, Feb. 2008, p. 16.

Yekhanin, Sergey., "Locally Decodable Codes", Retrieved at <<http://research.microsoft.com/en-us/um/people/yekhanin/Papers/LDC_now.pdf>>, Foundations and trends in theoretical computer science, 2011, p. 103.

"Erasure Coded Storage Aggregation in Data Centers", U.S. Appl. No. 12/534,024, Filed Date: Jul. 31, 2009. p. 48.

* cited by examiner

CLOUD DATA STORAGE USING REDUNDANT ENCODING

BACKGROUND

Cloud data storage (CDS) describes data storage available as a service to a user via a network. A typical CDS system comprises storage nodes such as a cluster of interconnected storage servers made available to a client via a network (such as the Internet). In general, the design of CDS systems is governed by three basic considerations or tradeoffs: reliability, locality, and redundancy. First, the system should reliably store the data in a recoverable form such that no data is lost when up to a threshold number ("bounded number" or "bounds") of storage nodes or machines of the CDS system data center fail or otherwise become unavailable. Second, the data stored in the CDS system should be readily available and recoverable by accessing only a small number of other machines in the system ("locality") for any combination of CDS system failures that are within the bounds. Third, the system should optimize the overall size (and cost) of storage resources by minimizing the storage of redundant data.

Designing CDS systems that perform well with respect to all three competing considerations poses a substantial challenge. Conventional CDS systems employ a solution based on either replication or Reed Solomon encoding (RSE). The replication approach is where each file is replicated and stored on different machines to yield good reliability and locality but does little to minimize redundancy (thus leading to high costs). The RSE approach, on the other hand, groups pieces of data together into blocks that are encoded using an optimal erasure code (known as the Reed Solomon code or RSC) to yield good reliability and redundancy but, since any data recovery necessarily involves a large number of machines, provides poor locality.

In addition, the nodes or machines of a CDS system are typically organized into clusters that constitute upgrade domains where software and hardware upgrades are applied to all machines in a single domain at the same time, effectively rendering all data stored within that domain temporarily unavailable. For upgrade efficiency, optimal design considerations also require that the number of upgrade domains to be relatively small. Consequently, a significant challenge for a CDS system is placing data (system data and encoded redundant data) onto a small number of upgrade domains in a manner that keeps data available when certain machines are inaccessible due to failures even when an entire domain is inaccessible due to an upgrade.

SUMMARY

Various implementations disclosed herein are directed to CDS systems and methods based on a class of redundant erasure-correcting encodings (termed "cloud encodings" or "cloud codes") that balance reliability, locality, and redundancy to provide quick and efficient recovery for the common and frequently reoccurring situation where a single data node may be unavailable in the CDS system, but while still providing full and robust recovery for the relatively rarer situations where increasing numbers of simultaneous unavailable nodes (but still within threshold tolerances) occur with the CDS system.

In some implementations, the CDS systems and methods partition data symbols (fundamental blocks of system data) into predefined-sized groups, use cloud encoding to form corresponding parity symbols for each group (that are then added to the group) and global redundant symbols, and store each symbol (data, parity, and global redundant) in different failure domains in order to ensure independence of failures.

In several implementations, the resultant cloud-encoded data features both data locality and can recover up to a predefined threshold tolerance of simultaneous erasures (e.g., data loss or unavailability) without any information loss with the CDS system.

In addition, certain implementations include the placement of cloud-encoded data in domains (nodes or node groups) in a manner that is able to provide similar locality and redundancy features even when an entire domain of data is unavailable due to software or hardware upgrades or failures. More specifically, such CDS systems are still able to recover one less than the predefined threshold of simultaneously lost or unavailable data even when an entire domain is unavailable.

This summary is provided to introduce a selection of concepts in a simplified form that are further described below in the detailed description. This summary is not intended to identify key features or essential features of the claimed subject matter, nor is it intended to be used to limit the scope of the claimed subject matter.

BRIEF DESCRIPTION OF THE DRAWINGS

To facilitate an understanding of and for the purpose of illustrating the present disclosure and various implementations, exemplary features and implementations are disclosed in, and are better understood when read in conjunction with, the accompanying drawings—it being understood, however, that the present disclosure is not limited to the specific methods, precise arrangements, and instrumentalities disclosed. Similar reference characters denote similar elements throughout the several views. In the drawings.

DETAILED DESCRIPTION

Figure 1:
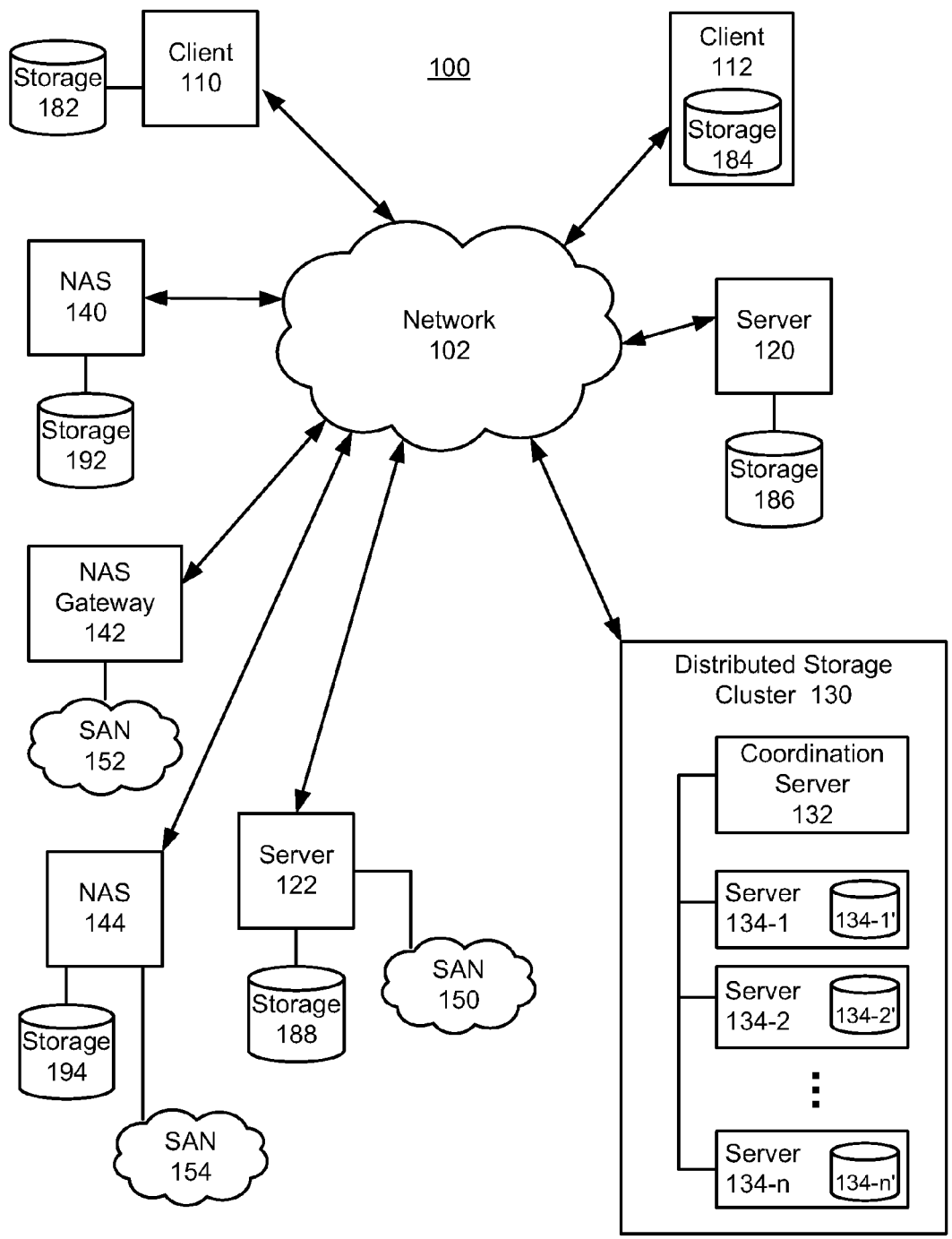
FIG. 1 is an illustration of an exemplary networked computer environment in which the numerous implementations disclosed herein may be utilized.

FIG. 1 is an illustration of an exemplary networked computer environment 100 in which the numerous implementations disclosed herein may be utilized. The network environment 100 may include one or more clients 110 and 112 configured to communicate with each other or with one or more servers 120 and 122 through a network 102 which may be a variety of network types including the public switched telephone network (PSTN), a cellular telephone network, and a packet switched network (e.g., the Internet). A client, such as client 110, may comprise an external or removable storage device 182, or a client, such as client 112, may comprise an internal or non-removable storage device 184. A server, such as server 120, may also comprise a storage device 186 or a collection of storage devices.

The environment 100 may further comprise one or more network-attached storage (NAS) servers 140 and 144 configured to communicate with each other or with one or more clients 110 and 112 and/or one or more servers 120 and 124 through the network 102. An NAS server 140 and 144 may also comprise a storage device 192 and 194, respectively. The storage devices 182, 184, 186, 188, 192, and 194 may be a disk array or any other storage system.

In addition, the environment 100 may also comprise one or more storage area networks (SANs) 150, 152, and 154 that are operatively coupled to, for example, a server (such as coupled to server 120), an NAS server (such as the SAN 154 coupled to NAS server 144), or to an NAS gateway 142 that together with its SAN 152 together provide the functionality of an NAS server. A server or an NAS server, such as NAS server 144, may comprise both a storage device 194 and a SAN 154. The environment 100 may also comprise one or more distributed storage clusters 130 comprising a coordination server 132 and a plurality of data servers 134-1, 134-2, ..., 134-$n$ comprising storage 134-1', 134-2', ..., 134-$n$', respectively, communicatively coupled via a local area network for example.

While the clients 110 and 112, servers 120 and 122, NAS servers 140 and 144, NAS gateway 142, and distributed storage cluster 130 are illustrated as being connected by the network 102, in some implementations it is contemplated that these systems may be directly connected to each other or even executed by the same computing system. Similarly, while the storage devices 182, 184, 186, 188, 192, 194, 134-1', 134-2', and 134-$n$' are shown as connected to a client or a server, in some implementations it is contemplated that the storage devices 182, 184, 186, 188, 192, 194, 134-1', 134-2', and 134-$n$' may be connected to each other or to more than one client and/or server, and that such connections may be made over the network 102 as well as directly. This is also true for the SANs 150, 152, and 154, although each SAN's own intra-network of storage devices is generally not directly accessible by these other devices.

Figure 6:
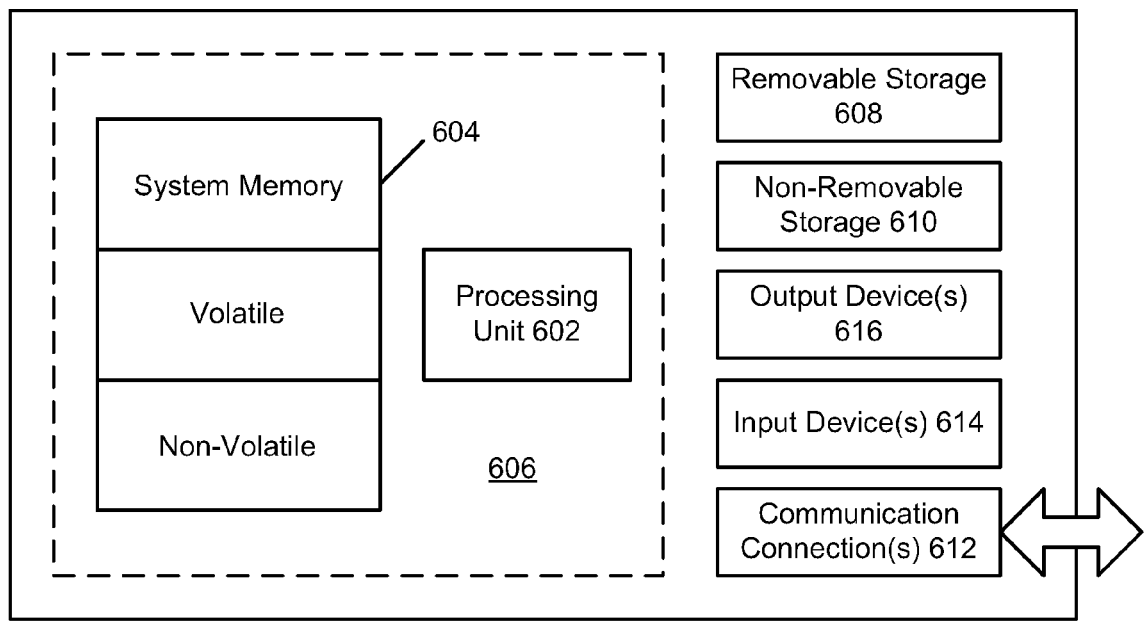
FIG. 6 shows an exemplary computing environment.

In some implementations, the clients 110 and 112 may include a desktop personal computer, workstation, laptop, PDA, cell phone, smart phone, or any WAP-enabled device or any other computing device capable of interfacing directly or indirectly with the network 102 such as a computing device 600 illustrated in FIG. 6. The clients 110 and 112 may run an HTTP client (e.g., a web-browsing program) or a WAP-enabled browser in the case of a cell phone, PDA or other wireless device, or the like, allowing a user of the clients 110 and 112 to access information available to it at the servers 120 and 122 or to provide information to the servers 120 and 122. Other applications may also be used by the clients 110 and 112 to access or provide information to the servers 120 and 122, for example. In some implementations, the servers 120 and 122 may be implemented using one or more general purpose computing systems such as the computing device 600 illustrated in FIG. 6.

As described herein, cloud encoding has two main parameters: r, which refers to the "locality" or maximum number of coded blocks to be used to recover a data block that is lost or unavailable; and d, which refers to the Hamming distance indicating the target or threshold or "bounds" corresponding to the minimum number of simultaneously lost or unavailable coded blocks which will result in unrecoverable data loss (that is, information loss) within the CDS system. Thus, if r=5 and d=4, for example, then the CDS system is able to recover any lost data symbol by accessing only five other symbols (data symbols and/or encoded symbols) and can fully recover up to three encoded data symbols (one less than the threshold value) that are simultaneously unavailable in the CDS system.

Figure 2:
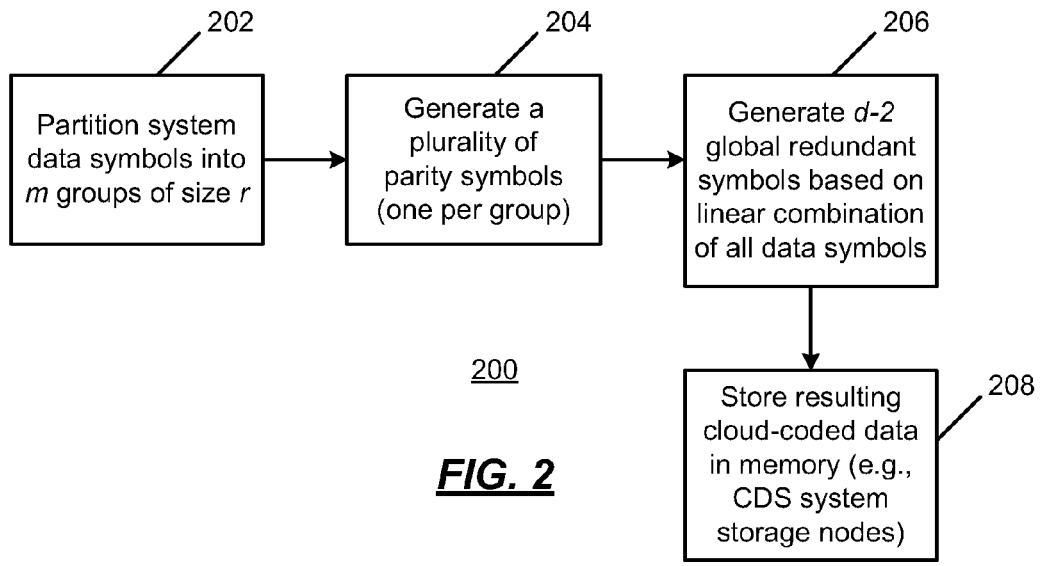
FIG. 2 is a process flow diagram illustrating a method for cloud encoding according to various implementations disclosed herein.
Figure 3:
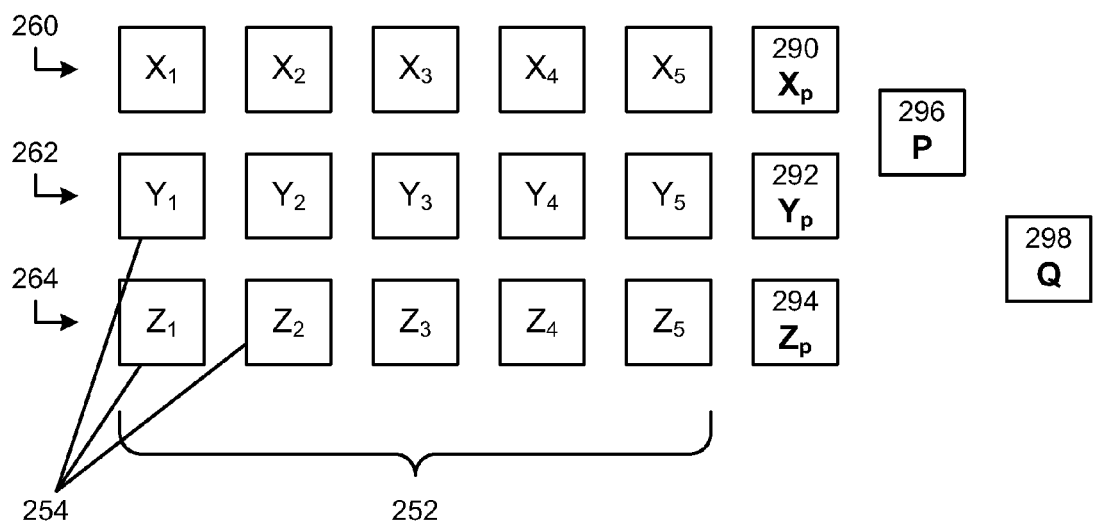
FIG. 3 is a block diagram illustrating the generation of cloud-encoded data for an exemplary implementation of the method of FIG. 2.

FIG. 2 is a process flow diagram illustrating a method 200 for cloud encoding according to various implementations disclosed herein. FIG. 3 is a block diagram 250 illustrating the generation of cloud-encoded data for an exemplary implementation of the method 200 of FIG. 2. Referring to FIGS. 2 and 3, an "(r,d) cloud code" for various such implementations may be formed by encoding system data 252 comprising a plurality of fundamental data symbols 254 (which may also be variously referred to as data chunks, data blocks, or data elements) into a plurality of local redundant parity symbols 290, 292, and 294 and a limited set of global redundant symbols 296 and 298 that together comprise the redundant data to complement the system data and provide the attributes of the CDS system. It is noted that only a few examples of the data symbols 254 are labeled in the figures for clarity, but it will still be recognized that all blocks comprising the system data 252 are in fact data symbols 254.

More specifically, at 202, the CDS system partitions the data symbols comprising the system data into m groups of size r where, again, r is the locality parameter corresponding to the maximum number of symbols used to recover a lost or unavailable data symbol. In an implementation, m can be calculated by dividing the total number of symbols 254 comprising the entire system data 252 by the value of r (and, for example, rounding up to the next whole-number integer). For example, as illustrated with respect to FIG. 3, for an exemplary (5,4) cloud code (where r=5) and the system data 252 comprises fifteen total data symbols 254, the system data 252 is partitioned into three groups 260, 262, and 264 of five data symbols 254 each corresponding to the rows shown in the table-like structure of FIG. 3. For each group, the CDS system also stores each data symbol in different failure domains (corresponding to columns in the structure shown in FIG. 3) in order to ensure independence of failures (discussed further herein).

At 204, the CDS system generates a plurality of parity symbols 290, 292, and 294—one for each group 260, 262, and 264—based on a sum (e.g., a bit-wise XOR operation) of the symbols in each group and represented by formula (1):

$$\sum_{j=1}^{r} X_j \qquad (1)$$

where X (as shown) represents the data symbols of the first symbol group, and where Y and Z could be used to represent the data symbols from the second and third groups, respectively, in this example or, more generally, where X is a representative member of the set $\{X, Y, ..., Z\}$ corresponding to each symbol group. For certain embodiments, each of these parity symbols 290, 292, and 294 may be stored separately from (i.e., in a different domain than) the data symbols 254 in each parity symbol's corresponding group.

At 206, the CDS system calculates a total of d−2 global redundant symbols 296 and 298 over the entire system data 252 (that is, two less than the value of d which is given as four for this example of a (5,4) cloud code). These global redundant symbols may be based on a linear combination of all data symbols 254 comprising the system data 252 and represented by the formula (2):

$$\sum_{j=1}^{r} \left( c_j^{g,1} X_j + \ldots + c_j^{g,m} Z_j \right) \quad (2)$$

where the set $\{X, Y, \ldots, Z\}$ corresponds to each symbol group 260, 262, and 264, c is a coefficient assigned to that particular data symbol, g corresponds to a power from 1 to d−2 (i.e., an increasing power for each global redundant symbol, herein this example 1 and 2 corresponding to each global redundant symbol 296 and 298 denoted by P and Q, respectively), and m and j effectively correspond to the row and column reference, respectively, for uniquely identifying each coefficient c corresponding to each data symbol 254 comprising the system data 252.

At 208, the resulting cloud-coded data may be stored in memory for subsequent use. In an implementation, the resulting data may be stored in CDS system storage nodes.

With regard to the set of coefficients $\{c\}$, and for several such implementations disclosed herein, each such coefficient is selected from a finite field that, for each group X to Z, are denoted by enumerated coefficient elements α to ω, that is, the sets $\{\alpha_1, \alpha_2, \ldots, \alpha_r\}$ to $\{\omega_1, \omega_2, \ldots, \omega_r\}$ corresponding to the system data set of $\{X, \ldots, Z\}$. These coefficient elements (also variously referred to as "coefficients" or "elements") are then assigned such that, where d=4 for example, the following three conditions are met: (1) elements in each group are distinct and non-zero; (2) no two elements from one group sum to an element from another group; and (3) no two elements from one group sum to the same value as some two elements of another group. Thus, the following resultant symbols may be determined for P and Q (that is, for the two global redundant symbols 296 and 298, respectively) as shown in formula (3) and formula (4):

$$P = \sum_{j=1}^{r} (\alpha_j X_j + \ldots + \omega_j Z_j) \quad (3)$$

$$Q = \sum_{j=1}^{r} (\alpha_j^2 X_j + \ldots + \omega_j^2 Z_j) \quad (4)$$

For higher values of d, the conditions are similar but become more complex such that, for example, the conditions for d=5 would require: (a) elements in each group are distinct and non-zero; (b) no two or three elements from one group sum to an element from another group; and (c) no two or three elements from one group sum to the same value as some two or three elements of another group. It should also be noted that three (again, d−2) global redundant symbols (e.g., P, Q, and R) would need to be formed given this value of d. Nevertheless, CDS systems with d=4 are more common than other configurations, and so the continuing focus of this disclosure is on such a system as illustrated in the exemplary implementation of FIG. 3.

By choosing coefficients in the manner set forth above (and in compliance with the features heretofore described), the resulting cloud-encoding of the CDS system is able to ensure that the system data 252 comprising the plurality of data symbols 254 and the corresponding encoded data symbols—together comprising a total of (r+1)m+(d−2) symbols—has both data locality r (i.e., where each and every data symbol 254 in the system data 252 can be recovered from only r other symbols) and can reliably recover from any three simultaneous erasures (i.e., the loss of any three symbols) without any information lost from the original system data 252. In addition, the parity symbols 290, 292, and 294 can also be reconstructed from the r corresponding data symbols in their respective groups, while the global redundant symbols 296 and 298 can be reconstructed from all data symbols 254 (less than or equal in number to rm) just as they were originally created.

For certain such implementations, additional benefit may be derived when the cloud-coded data further conforms to an additional feature where the first coefficients (or elements) used for each group 260, 262, and 264 are the same and equal, that is, where $\alpha_1 = \ldots = \omega_1$. By choosing coefficients in this manner, the CDS system ensures that the resulting encoding of the system data 252 (comprising the plurality of data symbols 254) into the resultant cloud-coded data—comprising a total of (r+1)m+(d−2) coded symbols—has both data locality r (i.e., where each and every data symbol can be recovered from only r other symbols) and can reliably recover from any d−1 simultaneous erasures (i.e., the loss of any three symbols in the above example) without any loss of information from the original system data 252. The CDS system also ensures these implementations yield non-trivial (and thus more optimal) locality of the d−2 global redundant symbols 296 and 298 such that the global redundant symbols 296 and 298 can also be reconstructed from less than all (that is, less than r times m, or <rm) of the data symbols 254 by requiring no more than m(r−1)+1<rm data symbols to reconstruct a global redundant symbol 296 and 298.

Figure 4:
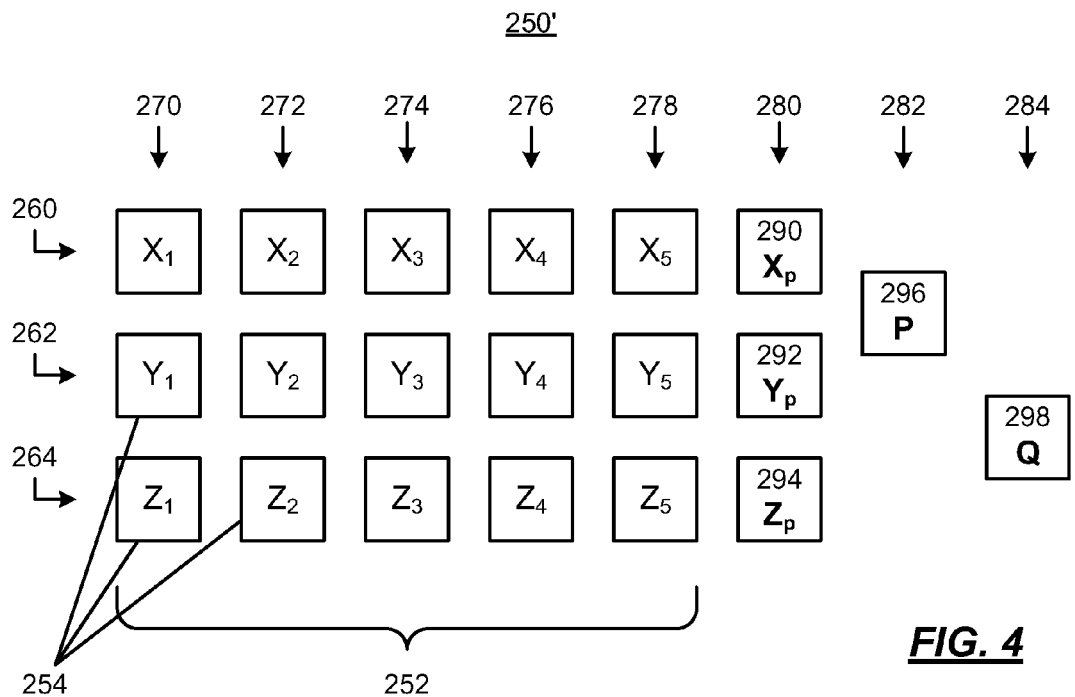
FIG. 4 is a block diagram illustrating the arrangement of resultant cloud-coded data from FIG. 3 residing in a minimum number of domains for select implementations.

FIG. 4 is a block diagram illustrating the arrangement 250' of resultant cloud-coded data 250 from FIG. 3 residing in the minimum number of domains. As illustrated, and for select implementations, the CDS system may feature the placement of cloud-encoded data within a minimum number of domains (nodes or node groups) in a manner that provides similar locality and redundancy features as other implementations disclosed herein plus the additional feature that, when an entire domain of data is unavailable due to software or hardware upgrades or failures, the CDS system is still able to recover one less than the predefined threshold (i.e., d−2) of simultaneously lost or unavailable data.

For such select implementations, each data symbol 254 from each individual group 260, 262, and 264 may be stored in different domains 270, 272, 274, 276, and 278 corresponding to columns in the table-like structure inherent to FIG. 3 and as illustrated in FIG. 4, where each domain may correspond to, for example, different storage nodes (or groups of storage nodes) comprising the CDS system. Similarly, the parity symbols 290, 292, and 294 may also be stored in a different domain 280 than the domains 270, 272, 274, 276, and 278 in which the data symbols 254 are stored. Lastly, the global redundant symbols 296 and 298 may also reside in different domains 282 and 284 than each other, the data symbols 254, and the parity symbols 290, 292, and 294. Thus, the resultant cloud-coded data—comprising the data symbols 252, the parity symbols 290, 292, and 294, and the global redundant symbols 296 and 298—may be stored in a minimum total of eight different domains 270, 272, 274, 276, 278, 280, 282, and 284 as shown.

Minimum domain optimization consistent with the locality and redundancy features for the various implementations herein may thus be achieved by organizing the domains as shown in FIG. 4, that is: (a) where the first elements of each group are stored in one domain, the second elements of each group are stored in a second domain, and so on and so forth with the $r^{th}$ element of each domain stored in the $r^{th}$ domain; (b) the parity symbols 290, 292, and 294 are stored in their own r+1 domain; and (c) where each global redundant symbol 296 and 298 (P and Q in the example) are stored in their own separate domains, e.g., r+2 and r+3. Thus, by using a total of r+3 domains in this arrangement, the CDS system can tolerate up to d−2 symbols (any combination of data, parity, or global redundant symbols) being unavailable in addition to an entire domain being unavailable.

Figure 5:
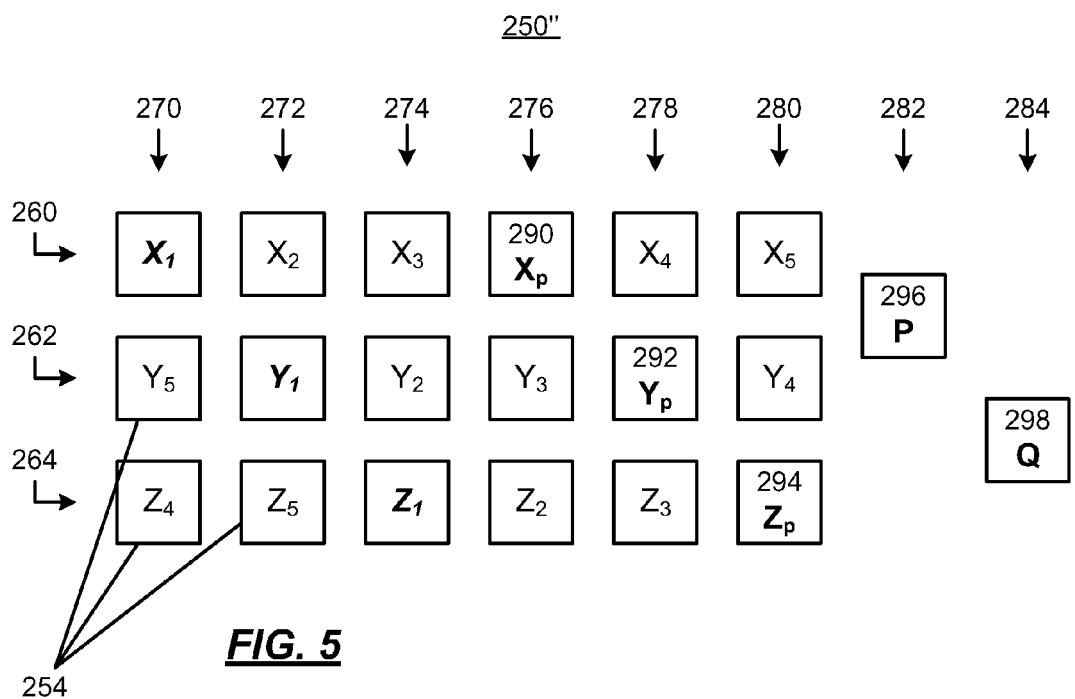
FIG. 5 is a block diagram illustrating the arrangement of resultant cloud-coded data from FIG. 3 more optimally residing in the minimum number of domains illustrated by FIG. 4 for certain select implementations.

FIG. 5 is a block diagram illustrating the arrangement 250″ of resultant cloud-coded data 250 from FIG. 3 to more optimally reside in the same minimum number of domains illustrated by FIG. 4. As illustrated, and for certain select implementations when the number of first data symbols and parity symbols is less than or equal to one more than the locality parameter (i.e., when 2 m≤r+1), the foregoing upgrade-tolerance feature may be even further enhanced for optimality with regard to parity locality when elements $\alpha_1 = \ldots = \omega_1$ (as previously discussed). For such implementations, improving parity locality for the global redundant symbols from rm to m(r−1)+1<rm, as previously discussed, during a domain upgrade can be achieved by reordering the domains such that: (a) the global redundant symbols 296 and 298 still reside in their own domains with no other symbols; (b) all data symbols 254 from any group 260, 262, and 264 and their corresponding parity symbol 290, 292, and 294 for that group reside in different domains; and (c) both the $X_1, Y_1, \ldots Z_1$ symbols (pertaining to the $\alpha_1 = \ldots = \omega_1$ elements) and the parity symbols 290, 292, and 294 each reside in different upgrade domains—as shown in FIG. 5.

Alternately, improved parity locality can also be achieved when the number of first data symbols and parity symbols is greater than one more than the locality parameter (i.e., when 2 m>r+1), although such CDS systems uses additional domains—more than r+3 domains and, specifically, 2 m+(d−2) (or 2 m+d−2) domains—to accommodate the aforementioned features. Thus for (r,4) cloud codes, for example, the number of domains used will be equal to two times the number of groups plus two (i.e., 2 m+2) to provide a different upgrade domain for each first data symbol (having elements $\alpha_1 = \ldots = \omega_1$), each parity symbol, and each global redundant symbol (two of them, P and Q, when d=4).

While the foregoing exemplary implementations illustrated in FIGS. 3, 4, and 5 are based on the typical cloud-coding parameter for fault tolerance using a threshold value of d=4 and thus using only two global redundant symbols 296 and 298 (P and Q), higher thresholds may be used and the implementations disclosed herein may be adapted to such higher thresholds accordingly. Regardless, compared to solutions such as RSE discussed earlier herein, various implementations disclosed herein provide an efficient and more optimal balance between locality and fault tolerance to provide timely and straightforward correction for the common case of a single data symbol fault (which relies only on a corresponding parity symbol to effect recovery) while still providing robust recovery for the rare case of multiple simultaneous data symbol losses (e.g., 3 for any d=4 CDS system) as well as comparable recovery capabilities even during system upgrades to an entire domain (e.g., 2 for any d=4 CDS system).

FIG. 6 shows an exemplary computing environment in which example implementations and aspects may be implemented. The computing system environment is only one example of a suitable computing environment and is not intended to suggest any limitation as to the scope of use or functionality. Numerous other general purpose or special purpose computing system environments or configurations may be used. Examples of well known computing systems, environments, and/or configurations that may be suitable for use include, but are not limited to, personal computers (PCs), server computers, handheld or laptop devices, multiprocessor systems, microprocessor-based systems, network personal computers, minicomputers, mainframe computers, embedded systems, distributed computing environments that include any of the above systems or devices, and the like.

Computer-executable instructions, such as program modules, being executed by a computer may be used. Generally, program modules include routines, programs, objects, components, data structures, etc. that perform particular tasks or implement particular abstract data types. Distributed computing environments may be used where tasks are performed by remote processing devices that are linked through a communications network or other data transmission medium. In a distributed computing environment, program modules and other data may be located in both local and remote computer storage media including memory storage devices.

With reference to FIG. 6, an exemplary system for implementing aspects described herein includes a computing device, such as computing device 600. In its most basic configuration, computing device 600 typically includes at least one processing unit 602 and memory 604. Depending on the exact configuration and type of computing device, memory 604 may be volatile (such as RAM), non-volatile (such as read-only memory (ROM), flash memory, etc.), or some combination of the two. This most basic configuration is illustrated in FIG. 6 by dashed line 606.

Computing device 600 may have additional features/functionality. For example, computing device 600 may include additional storage (removable and/or non-removable) including, but not limited to, magnetic or optical disks or tape. Such additional storage is illustrated in FIG. 6 by removable storage 608 and non-removable storage 610.

Computing device 600 typically includes a variety of computer readable media. Computer readable media can be any available media that can be accessed by device 600 and includes both volatile and non-volatile media, removable and non-removable media.

Computer storage media include volatile and non-volatile, and removable and non-removable media implemented in any method or technology for storage of information such as computer readable instructions, data structures, program modules or other data. Memory 604, removable storage 608, and non-removable storage 610 are all examples of computer storage media. Computer storage media include, but are not limited to, RAM, ROM, electrically erasable program read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 600. Any such computer storage media may be part of computing device 600.

Computing device 600 may contain communication connection(s) 612 that allow the device to communicate with other devices. Computing device 600 may also have input device(s) 614 such as a keyboard, mouse, pen, voice input device, touch input device, etc. Output device(s) 616 such as a display, speakers, printer, etc. may also be included. All these devices are well known in the art and need not be discussed at length here.

It should be understood that the various techniques described herein may be implemented in connection with hardware or software or, where appropriate, with a combination of both. Thus, the methods and apparatus of the presently disclosed subject matter, or certain aspects or portions thereof, may take the form of program code (i.e., instructions)

embodied in tangible media, such as floppy diskettes, CD-ROMs, hard drives, or any other machine-readable storage medium where, when the program code is loaded into and executed by a machine, such as a computer, the machine becomes an apparatus for practicing the presently disclosed subject matter.

Although exemplary implementations may refer to utilizing aspects of the presently disclosed subject matter in the context of one or more stand-alone computer systems, the subject matter is not so limited, but rather may be implemented in connection with any computing environment, such as a network or distributed computing environment. Still further, aspects of the presently disclosed subject matter may be implemented in or across a plurality of processing chips or devices, and storage may similarly be affected across a plurality of devices. Such devices might include personal computers, network servers, and handheld devices, for example.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A method for storing system data comprising a plurality of data symbols, the method comprising:
    partitioning the system data into a plurality of groups, wherein each group from among the plurality of groups has no more than a predetermined number of data symbols, and wherein the predetermined number of data symbols corresponds to a locality parameter;
    generating a plurality of parity symbols for each group from among the plurality of groups and adding a parity symbol from among the plurality of parity symbols to the group from among the plurality of groups corresponding to the parity symbol;
    calculating at least two global redundant symbols based on the system data; and
    storing results of the generating and the calculating in different failure domains;
    wherein the results comprise data that comprises a total number of symbols equal to (r+1)m+(d−2) where r is a locality parameter, m is a number of groups parameter, and d is a parameter corresponding to the minimum threshold number of unavailable data symbols that result in unrecoverable system data information.

2. The method of claim 1, wherein the generating comprises generating each parity symbol for each group based on a sum of a set of data symbols that comprise each group.

3. The method of claim 1, wherein the calculating comprises calculating each global redundant symbol based on a linear combination of the plurality of data symbols comprising the system data.

4. The method of claim 3, wherein each linear combination comprises the application of a set of coefficients to the plurality of data symbols comprising the system data, wherein the set of coefficients comprises coefficients that are non-zero and distinct from other coefficients used for other data symbols within the group, wherein no two coefficients corresponding to any one group sums to a value equal to a coefficient in any other group, and wherein no two coefficients corresponding to any one group sums to a value equal to the sum of two coefficients in any other group.

5. The method of claim 4, wherein each data symbol, parity symbol, and global redundant symbol reside in a plurality of domains such that no two data symbols from the same group reside in the same domain, no data symbol resides in the same domain as the parity symbol from its group, and no global redundant symbol resides in the same domain as any data symbol or parity symbol.

6. The method of claim 5, further comprising associating a first set of coefficients to one data symbol per each group among the plurality of groups, wherein all coefficients comprising the first set of coefficients are equal.

7. The method of claim 6, further comprising associating a first set of data symbols to the first set of coefficients, wherein all data symbols comprising the first set of data symbols and all parity symbols reside in different domains.

8. The method of claim 1, wherein the results comprise a resultant cloud-encoded data, and d corresponds to a Hamming distance within a cloud data storage system.

9. The method of claim 1, wherein the total number of symbols reside on r+3 domains when $2 \ m \leq r+1$.

10. The method of claim 1, wherein the total number of symbols reside on $2 \ m+(d-2)$ domains when $2 \ m > r+1$.

11. The method of claim 10, wherein a number of global redundancy symbols formed is equal to two less than a minimum threshold number of unavailable data symbols that result in unrecoverable system data information.

12. The method of claim 11, wherein the minimum threshold number of unavailable data symbols that result in unrecoverable system data information is a Hamming distance.

13. A system for storing system data comprising a plurality of data symbols, the system comprising:
    a processor that receives a locality parameter r and a distance parameter d, that partitions the system data into m groups wherein each group comprises no more than r data symbols, that generates m parity symbols for each of the m groups and adds one parity symbol to each of the m groups, and that calculates d−2 global redundant symbols; and
    a memory that stores results of the calculating.

14. The system of claim 13, wherein at least one parity symbol is generated as a sum according to the formula $$\sum_{j=1}^{r} X_j$$

wherein X corresponds to the at least one group.

15. The system of claim 13, wherein at least one global redundant symbol is generated according to the formula $$\sum_{j=1}^{r} \left( c_j^{g,1} X_j + \ldots + c_j^{g,m} Z_j \right)$$

wherein X, . . . , Z correspond to each group among the m groups and wherein c is non-zero.

16. The system of claim 15, wherein d=4 and wherein each value of c is distinct from other values for c in the same group, no two c values in one group sum to a value equal to any other c in any other group, and no two c values sum to a value equal to the sum of any other two c values in one of any other group.

17. The system of claim 15, wherein d=5 and wherein each value of c is distinct from other values for c in the same group, no two or three c values in one group sum to a value equal to any other c in any other group, and no two or three c values sum to a value equal to the sum of any other two or three c values in one of any other group.

18. A computer-readable storage medium comprising computer-readable instructions that when executed by a computer cause the computer to:
- receive a plurality of data symbols, a locality parameter r, and a distance parameter d;
- create cloud-encoded data comprising m groups wherein each group comprises no more than r data symbols, m parity symbols one each for the m groups, and d−2 global redundant symbols; and
- recover up to d−1 simultaneously unavailable data symbols without loss of information using no more than r other data symbols to recover each unavailable data symbol.

19. The computer-readable medium of claim 18, wherein an unavailable global redundant symbol is recovered using no more than m(r−1)+1 data symbols.

20. The computer-readable medium of claim 18, further comprising computer-readable instructions that when executed by the computer cause the computer to:
- organize the data symbols, the parity symbols, and the global redundant symbols into a plurality of domains;
- update a plurality of data symbols in a domain from among the plurality of domains; and
- recover all data symbols in one update domain and up to an additional d−2 simultaneously unavailable data symbols without any loss of information.

* * * * *